United States Patent
Cleveland et al.

(10) Patent No.: US 7,764,925 B2
(45) Date of Patent: Jul. 27, 2010

(54) WIRELESS REPEATER USING CROSS-POLARIZED SIGNALS TO REDUCE FEEDBACK IN AN FDD WIRELESS NETWORK

(75) Inventors: Joseph R. Cleveland, Murphy, TX (US); Paul G. Nelson, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1107 days.

(21) Appl. No.: 11/012,450

(22) Filed: Dec. 15, 2004

(65) Prior Publication Data

US 2006/0063487 A1   Mar. 23, 2006

Related U.S. Application Data

(60) Provisional application No. 60/608,299, filed on Sep. 7, 2004, provisional application No. 60/608,282, filed on Sep. 7, 2004.

(51) Int. Cl.
*H04B 7/15* (2006.01)
(52) U.S. Cl. .......................................... 455/11.1; 455/7
(58) Field of Classification Search ............ 379/406.01; 455/570, 7, 101, 11.1
See application file for complete search history.

(56) References Cited

U.S. PATENT DOCUMENTS

| 5,115,514 | A  |   | 5/1992  | Leslie |
| 5,267,297 | A  |   | 11/1993 | Kawano et al. |
| 5,349,694 | A  |   | 9/1994  | Kawano et al. |
| 5,835,848 | A  |   | 11/1998 | Bi et al. |
| 5,963,847 | A  |   | 10/1999 | Ito et al. |
| 6,697,603 | B1 | * | 2/2004  | Lovinggood et al. ....... 455/13.1 |
| 6,731,904 | B1 |   | 5/2004  | Judd |
| 6,745,003 | B1 |   | 6/2004  | Maca |
| 2003/0072363 | A1 | * | 4/2003 | McDonald et al. .......... 375/232 |
| 2004/0110469 | A1 |   | 6/2004 | Judd |
| 2004/0166802 | A1 | * | 8/2004 | McKay et al. ................ 455/15 |
| 2005/0007636 | A1 | * | 1/2005 | Leung ........................ 358/434 |

FOREIGN PATENT DOCUMENTS

JP   2000-183797   6/2000

* cited by examiner

*Primary Examiner*—Yuwen Pan
*Assistant Examiner*—Ankur Jain

(57) ABSTRACT

A repeater for re-transmitting signals between first and second wireless devices. The repeater comprises a first antenna array for receiving a forward channel signal transmitted from the first wireless device and a second antenna array for receiving a reverse channel signal transmitted from the second wireless device. The repeater also comprises a first transceiver chain for down-converting the received forward channel signal, processing the down-converted forward channel signal, and up-converting the processed forward channel signal to thereby produce an outgoing forward channel signal. The repeater also comprises a second transceiver chain for down-converting the received reverse channel signal, processing the down-converted reverse channel signal, and up-converting the processed reverse channel signal to thereby produce an outgoing reverse channel signal. The first antenna array comprises a first antenna element and the second antenna array comprises a second antenna element that is cross-polarized with respect to the first antenna element.

20 Claims, 6 Drawing Sheets

WIRELESS REPEATER USING CROSS-POLARIZED SIGNALS TO REDUCE FEEDBACK IN AN FDD WIRELESS NETWORK

CROSS-REFERENCE TO RELATED APPLICATIONS AND CLAIM OF PRIORITY

The present invention is related to that disclosed in U.S. Provisional Patent Application Ser. No. 60/608,299, filed Sep. 7, 2004, entitled "Method and Procedure for Using a Single RF Chain in a Wireless Repeater For Time-Division Duplexed Signals" and U.S. Provisional Patent Application Ser. No. 60/608,282, filed Sep. 7, 2004, entitled "Method and Procedure for Reduction of Feedback in a Wireless Repeater Using Cancellation of Cross-Polarized Signals". U.S. Provisional Patent Application Ser. Nos. 60/608,282 and 60/608,299 are assigned to the assignee of the present application. The subject matter disclosed in each of U.S. Provisional Patent Application Ser. Nos. 60/608,282 and 60/608,299 is hereby incorporated by reference into the present disclosure as if fully set forth herein. The present invention hereby claims priority under 35 U.S.C. §119(e) to U.S. Provisional Patent Application Ser. Nos. 60/608,282 and 60/608,299.

TECHNICAL FIELD OF THE INVENTION

The present invention relates generally to communication networks and, more specifically, to a wireless network repeater that uses cross-polarized signals to reduce echo for use in a frequency-division duplexed (FDD) wireless network.

BACKGROUND OF THE INVENTION

Consumers use a wide range of devices and networks, including cellular phones, paging devices, personal communication services (PCS) systems, and wireless data networks. Wireless service providers create new markets for wireless devices and expand existing markets by making wireless devices and services cheaper and more reliable. Wireless service providers attract new customers by reducing infrastructure costs and operating costs, by increasing handset battery life, and improving quality of service, and new and better features.

Inadequate coverage is a persistent problem in the quality of service of any wireless network. Natural and man-made obstacles frequently create radio frequency (RF) "holes" in the coverage area of a wireless network. Voice and data call connections are frequently dropped when a wireless terminal, such as a cell phone or a similar mobile station, enters an RF hole. Mobile stations that are already in an RF hole may not be able to reliably establish new connections. Typical areas in which RF holes occur include underground tunnels, buildings that have large footprints, tall buildings, and underground shopping malls.

Wireless service providers may attempt to improve coverage by deploying RF repeater transceivers. A variety of repeaters have been developed to improve the coverage of wireless networks. In U.S. patent application Ser. No. 09/998,238 (Publication No. 20030104781), Son describes a residential wireless repeater that achieves isolation between transmit and receive antennas by physical separation of the antennas. The repeater disclosed by Son requires two separate modular repeaters that communicate simultaneously with each other with low radio frequency.

In U.S. Pat. No. 6,731,904, Judd describes a modular repeater that includes a housing having a pair of substantially 180° oppositely facing surfaces. At least one antenna element is mounted to each of these surfaces for radiating energy in a direction opposite that of another antenna element mounted to the other surface. An electronic circuit within the housing operatively couples signals between at least one antenna element on each of the oppositely facing surfaces of the module housing.

In U.S. Pat. No. 6,697,603, Lovinggood et al. describe a digital repeater for receiving and retransmitting radio frequency (RF) signals. The Lovinggood repeater down-converts a received RF signal to an intermediate frequency (IF) signal, converts the IF signal into a digital signal, processes and amplifies the digital signal into an amplified signal using the digital signal processor, and converts the amplified signal into an analog signal. The Lovinggood repeater then up-converts the analog signal to an outgoing RF signal suitable for antenna transmission.

In U.S. Pat. No. 6,640,112, Lee et al. describe a repeating method for a wireless communication system which provides time and space diversities. The method of repeating a forward link communication signal for a wireless communication system includes the steps of: a) transmitting the forward link communication signal through a first transmitting antenna; b) delaying the forward link communication signal for a predetermined time period; and c) transmitting a delayed forward link communication signal which is generated by step b) through a second transmitting antenna.

In U.S. Pat. No. 4,283,795, Steinberger presents an adaptive cross-polarization cancellation arrangement in which a first desired polarized signal and a second interfering orthogonally polarized signal, including cross-polarization components, are concurrently received at an antenna. The orthogonally polarized components of the received signal are separated and transmitted along separate paths and recombined after the phase and amplitude of the separated polarized interfering signal sample have been adjusted for maxim cancellation of cross-polarization components in the other path.

Each of the prior art repeaters described above requires at least one of the following: i) physical separation of primary and secondary antenna sets by a significant distance to reduce the magnitude of the transfer function H such that H<1/G, where G is the repeater power gain; ii) precise adjustment of input-output phase adjustment embodied in H such that the vector product G*H is <0 in order to yield negative feedback; iii) separate modules for the reception of external signals and the retransmission of signals internal to the building; and iv) methods for the cancellation of multiple time-delayed echoes that would occur in a home or in-building environment with multiple scattering surfaces. The prior art repeaters generally do not provide a method of canceling any echoes from the output that would lead to unstable operation (i.e., oscillations).

Therefore, there is a need in the art for improved repeaters for use in wireless networks. In particular, there is a need for a repeater that cancels echoes and avoids oscillation.

SUMMARY OF THE INVENTION

The present invention provides a wireless repeater for use in a wireless network that employs frequency-division duplexed (FDD) transmission and reception. A repeater according to the principles of the present invention reduces feedback between an output antenna and an input antenna of the repeater that could cause instabilities or oscillations. The present invention uses a combination of antenna cross-polarization techniques and digital processing techniques to remove time-delayed feedback or echo terms. The signal processing techniques described herein may provide another 20-40 dB of gain isolation.

To address the above-discussed deficiencies of the prior art, it is a primary object of the present invention to provide a repeater for re-transmitting signals between a first wireless device and a second wireless device. According to an advantageous embodiment of the present invention, the repeater comprises: 1) a first antenna array for receiving a forward channel signal transmitted from the first wireless device; and 2) a second antenna array for receiving a reverse channel signal transmitted from the second wireless device. The repeater further comprises: 3) a first transceiver chain capable of down-converting the received forward channel signal, processing the down-converted forward channel signal, and up-converting the processed forward channel signal to thereby produce an outgoing forward channel signal suitable for transmission to the second wireless device; and 4) a second transceiver chain capable of down-converting the received reverse channel signal, processing the down-converted reverse channel signal, and up-converting the processed reverse channel signal to thereby produce an outgoing reverse channel signal suitable for transmission to the first wireless device. The first antenna array comprises a first antenna element and the second antenna array comprises a second antenna element that is cross-polarized with respect to the first antenna element.

According to one embodiment of the present invention, a ground plane associated with the repeater is disposed between the first antenna array and the second antenna array to thereby provide isolation between the first and second antenna arrays.

According to another embodiment of the present invention, each of the first and second transceiver chain further comprises an echo processor capable of attenuating in a respective one of the down-converted forward and reverse channel signals an echo signal associated with a respective one of the outgoing forward and reverse channel signals.

According to still another embodiment of the present invention, the each echo processor delays transmission of the outgoing one of the forward and reverse channel signals in order to minimize the echo signal in the respective one of the down-converted forward and reverse channel signals.

According to yet another embodiment of the present invention, the each echo processor comprises an echo detector for detecting the echo signal in the respective one of the down-converted forward and reverse channel signals.

According to a further embodiment of the present invention, the each echo processor further comprises an echo suppressor for suppressing at least a part of the echo signal in the respective one of the down-converted forward and reverse channel signals.

According to a still further embodiment of the present invention, the each echo processor comprises a time delay buffer for delaying transmission of the respective one of the down-converted forward and reverse channel signals.

According to a yet further embodiment of the present invention, the each echo processor further comprises a test signal generator capable of adding a known test signal to the respective one of the down-converted forward and reverse channel signals.

In one embodiment of the present invention, the echo processor is capable of detecting an echo of the test signal in the respective one of the down-converted forward and reverse channel signals and using a delay associated with the test signal echo to determine a delay associated with the delay buffer.

In another embodiment of the present invention, the repeater further comprises: 1) a first duplexer capable of coupling the first antenna array to an input of the first transceiver chain and to an output of the second transceiver chain; and 2) a second duplexer capable of coupling the second antenna array to an output of the first transceiver chain and to an input of the second transceiver chain Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged RF repeater transceiver.

Figure 1:
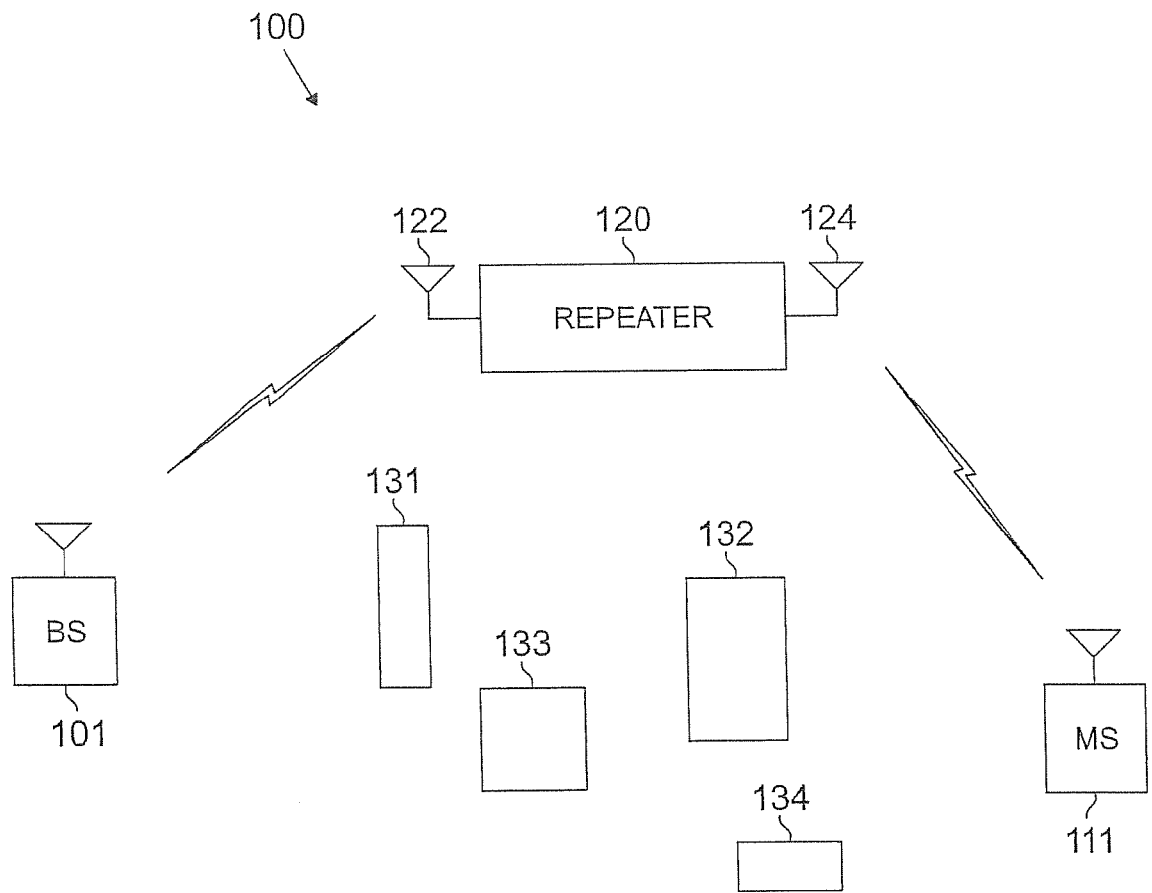
FIG. 1 illustrates an exemplary wireless network in which a repeater according to the principles of the present invention may be implemented.

FIG. 1 illustrates exemplary wireless network 100, which implements repeater 120 according to the principles of the present invention. Wireless network 100 comprises base station (BS) 101 and other base stations (not shown) that communicate with a plurality of mobile stations, such as mobile station (MS) 111, located in a coverage area of wireless network 100. In an advantageous embodiment of the present invention, base station (BS) 101 communicates with mobile station (MS) 111 over frequency-division duplexed (FDD) channels. By way of example, the FDD channels may use code division multiple access (CDMA) signals (e.g., CDMA2000). Alternative embodiments of the present invention may use 1xEV-DO, WCDMA, GMS/EDGE, IEEE-802.16, or other cellular signals with frequency division duplexing (FDD) on the forward (downlink) channels and the reverse (uplink) channels.

MS 111 may be any suitable wireless device, including a conventional cellular radiotelephone, a PCS handset device, a personal digital assistant (PDA), a portable computer, a telemetry device, or the like, that is capable of communicating with BS 101 via wireless links. The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass the exemplary types of mobile stations described above, as well as portable devices such as, for example, vehicle-mounted wireless devices.

Wireless network 100 further comprises wireless repeater 120. Forward channel (i.e., downlink) signals from BS 101 to MS 111 and reverse channel (i.e., uplink) signals from MS 111 to BS 101 may be blocked by objects 131-134. Repeater 120 may be used in wireless network 100 to extend the coverage range of BS 101 to areas, such as the vicinity of MS 111, where blockage or scattering causes large propagation losses. Objects 131-134 may include, for example, tunnels, terrain features (e.g., mountains, valleys), and large buildings.

Repeater 120 comprises donor antenna array 122, which communicates in the forward and reverse channels with BS 101, and server antenna array 124, which communicates in the forward and reverse channels with MS 111. Repeater 120 is placed in a location where the forward channel signal received from BS 101 exceeds a specified threshold. Repeater 120 filters and amplifies the received signal and retransmits the signal into the regions where the signal from BS 101 is too low for reliable reception. Repeater 120 performs a similar function in the reverse channel from MS 111 to BS 101.

Figure 2:
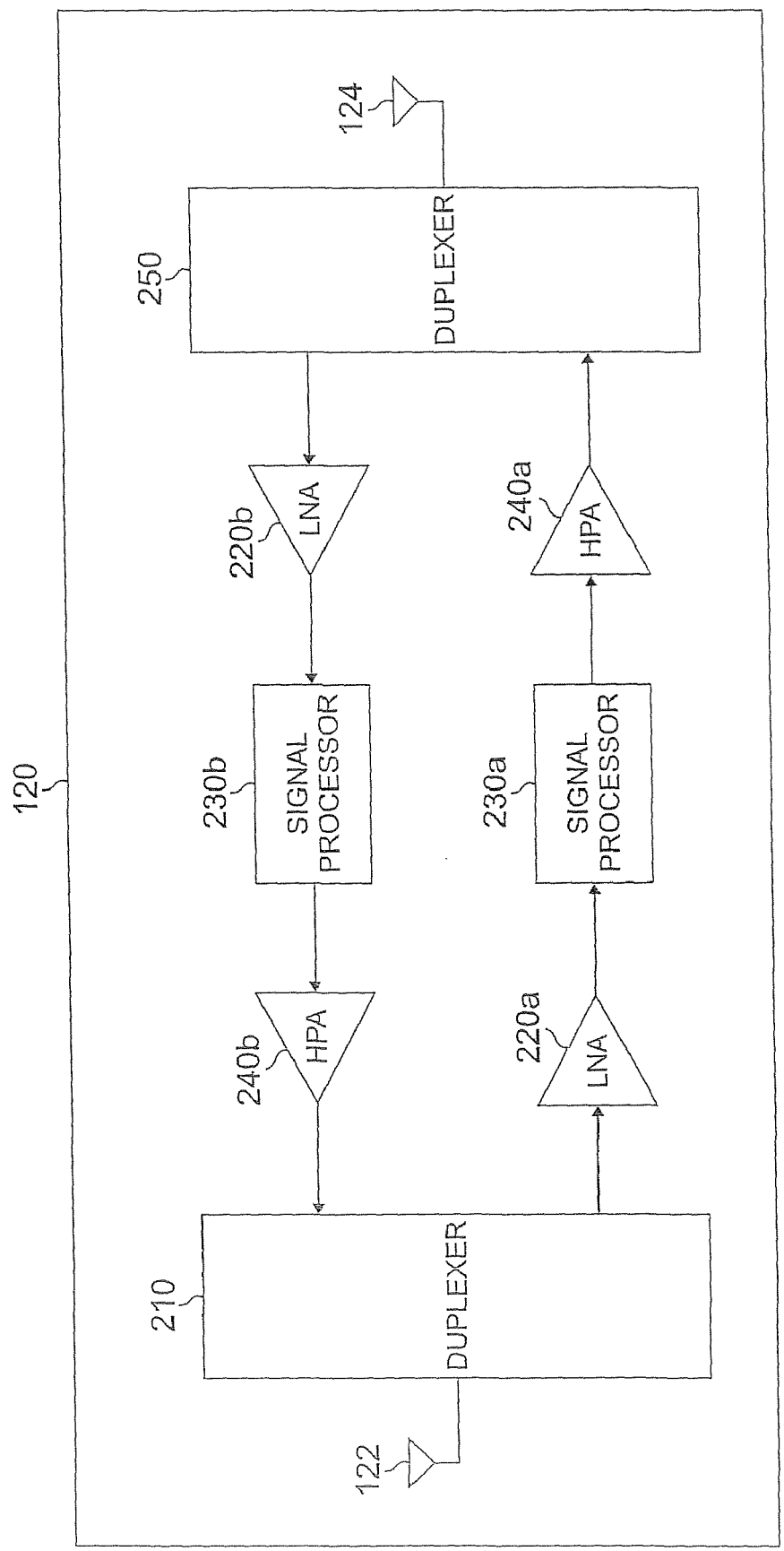
FIG. 2 illustrates an exemplary repeater according to one embodiment of the present invention.

FIG. 2 illustrates exemplary repeater 120 according to one embodiment of the present invention. Repeater 120 implements FDD operations using a single donor antenna array and a single server antenna array. Each antenna array uses a duplexer to support different transmit and receive frequencies. Repeater 120 comprises donor antenna array 122, duplexer 210, server antenna array 124, duplexer 250, a forward channel transceiver chain, and a reverse channel transceiver chain. The forward channel transceiver chain comprises low-noise amplifier (LNA) 220*a*, signal processor 230*a* and high-power amplifier (HPA) 240*a*. The reverse channel transceiver chain comprises low-noise amplifier (LNA) 220*b*, signal processor 230*b* and high-power amplifier (HPA) 240*b*.

Donor antenna array 122 receives forward channel (downlink) signals at a downlink frequency, fd, and sends the forward channel signals through duplexer 210 to the input of low-noise amplifier (LNA) 220*a*. LNA 220*a* amplifies the forward channel signals to an appropriates level for signal processor 230*a*. Signal processor 230*a* removes signal components coupled from the output antenna (i.e., server antenna array 124) to the input antenna (i.e., donor antenna array 122). Next, HPA 240*a* amplifies the regenerated forward channel signals for transmission via duplexer 250 and server antenna array 124.

Server antenna array 124 receives reverse channel (uplink) signals at an uplink frequency, fu, and sends the reverse channel signals through duplexer 250 to the input of low-noise amplifier (LNA) 220*b*. LNA 220*b* amplifies the reverse channel signals to an appropriates level for signal processor 230*b*. Signal processor 230*b* removes signal components coupled from the output antenna (i.e., server antenna array 124) to the input antenna (i.e., donor antenna array 122). Next, HPA 240*b* amplifies the regenerated reverse channel signal for transmission via duplexer 210 and donor antenna array 122.

A mobile station (MS) or other access terminal (AT) typically receives downlink transmissions of CDMA2000 signals in the range of −100 dBm to −80 dBm. The downlink signal fed to the transmit antenna in a wireless repeater in a home environment typically is in the range of +0 dBm to +10 dBm. The amplified and transmitted signal consists of the amplified input signal plus amplified noise. Hence the repeater chain for the downlink signal has an amplifier gain of 80 dB to 110 dB.

Figure 3:
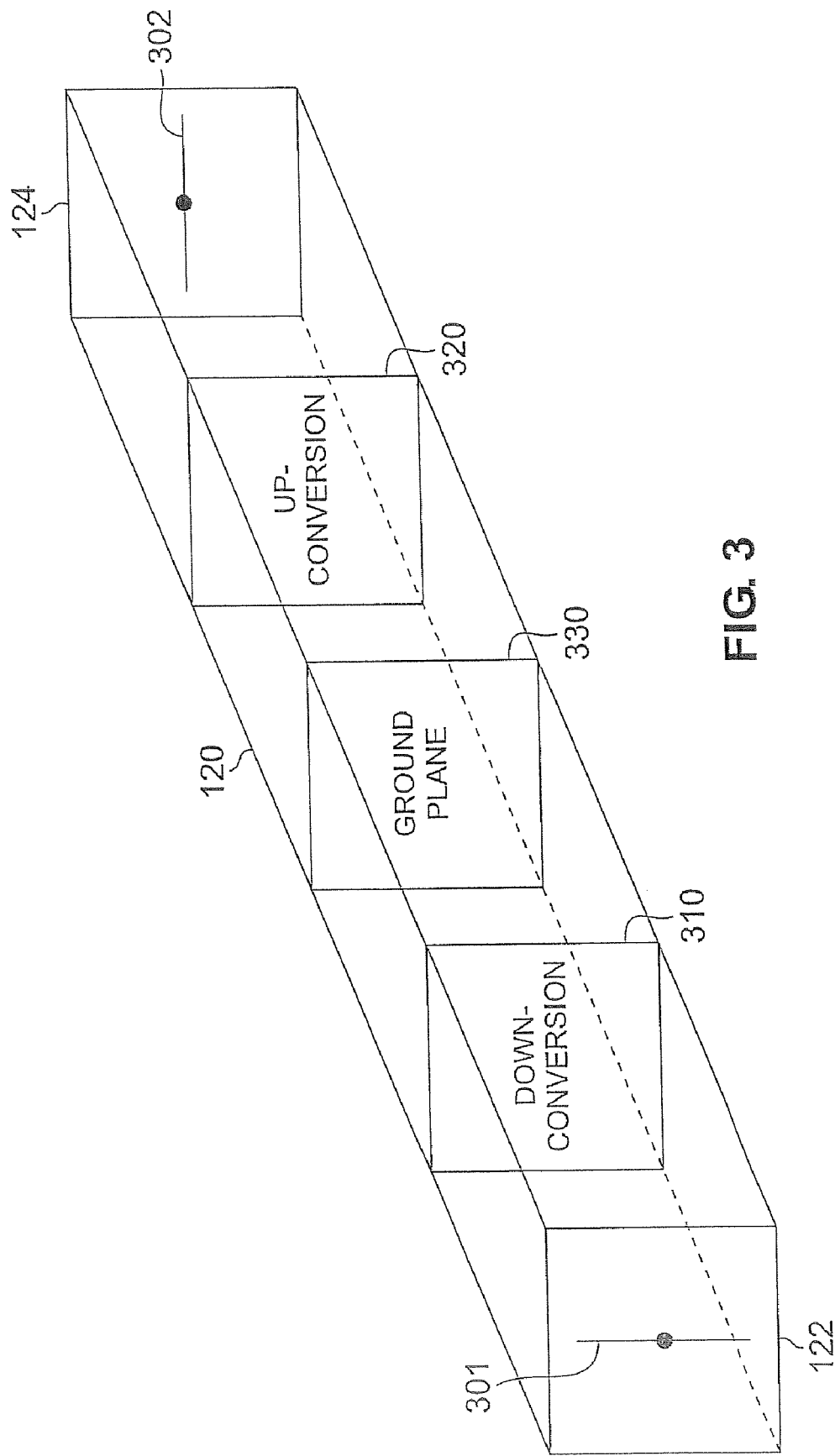
FIG. 3 is an architectural view of the exemplary repeater according to one embodiment of the present invention.

FIG. 3 is an architectural view of exemplary repeater 120 according to one embodiment of the present invention. Repeater 120 uses ground plane isolation and cross-polarization of antenna elements to minimize feedback between the donor antenna and the server antenna. Repeater 120 uses orthogonally polarized antenna elements 301 and 302 on opposite faces of the housing of repeater 120 to radiate power in directions opposite to each other. Thus, antenna element 301 in antenna array 122 is aligned at right angles with antenna element 302 in antenna array 124.

Electronic circuits mounted within the housing of repeater 120 couple signals between antenna elements 301 and 302 on the oppositely facing surfaces. Circuits that receive low-power signals are isolated from the power amplifier circuits for the down-link and the up-link by shielding techniques well-known in the field. Ground plane 330, which contains filtered feed-through lines, provides additional isolation between down-conversion circuitry 310 and up-conversion circuitry 320. This architecture also reduces the length of antenna feeds, a major source of coupling between co-located antennas.

Figure 4:
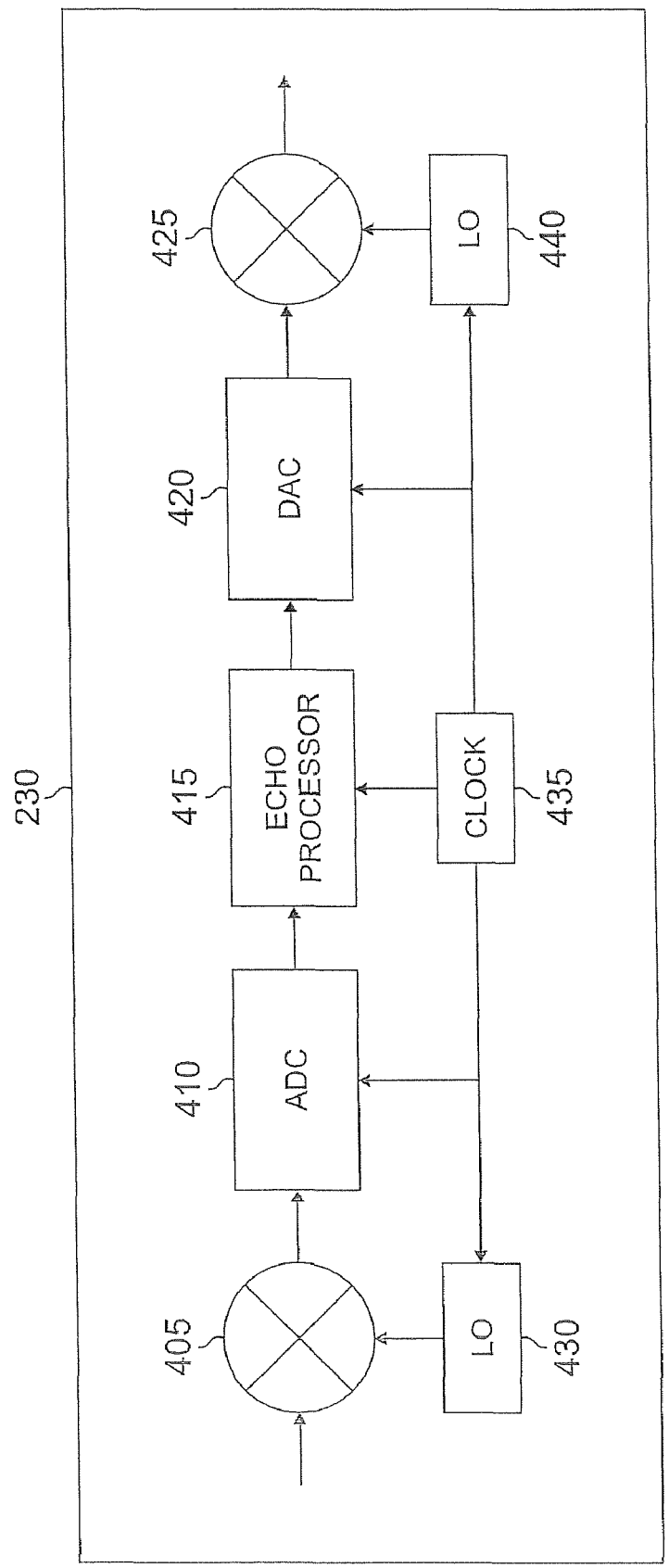
FIG. 4 illustrates an exemplary signal processor block according to one embodiment of the present invention.

FIG. 4 illustrates exemplary signal processor 230 (i.e., 230*a* or 230*b*) according to one embodiment of the present invention. Signal processor 230 provides further isolation by detecting and attenuating signals coupled from the transmitter antenna to the receiver antenna for both the forward (downlink) channel and the reverse (uplink) channel. Signal processor 230 comprises down-conversion mixer 405, analog-to-digital converter (ADC) 410, echo processor 415, digital-to-analog converter (DAC) 420, up-conversion mixer 425, local oscillator (LO) 430, clock 435 and local oscillator (LO) 440.

The incoming RF signal from LNA 220 is down-converted to baseband (or IF) by down-conversion mixer 405 and LO 430. ADC 410 converts the output of mixer 405 to digital samples, which are stored in memory in echo processor 415. Echo processor 415 then removes feedback (i.e., echoes) from the digital samples. The filtered samples are converted back to an analog signal by DAC 420. mixer 425 and LO 440 then up-convert the output of DAC 420 to an RF signal that is fed to the input of HPA 240.

In alternate embodiments, the ADC sampling may be performed in the RF band of the received signal or at an intermediate frequency (IF) level. The samples are taken over a time interval that represents the maximum propagation time expected for the latest arriving echo, generally less than 1 microsecond, for an in-building or home environment. To reduce the throughput of sampled date (bits/sec), sub-Nyquist sampling rates in either the RF band or in the IF band may be used. ADC 410 has a dynamic range and sampling frequency to differentiate the original, non-delayed signal from the amplified, delayed echo. Clock 435 synchronizes ADC 410 with the data transfer between blocks.

Figure 5:
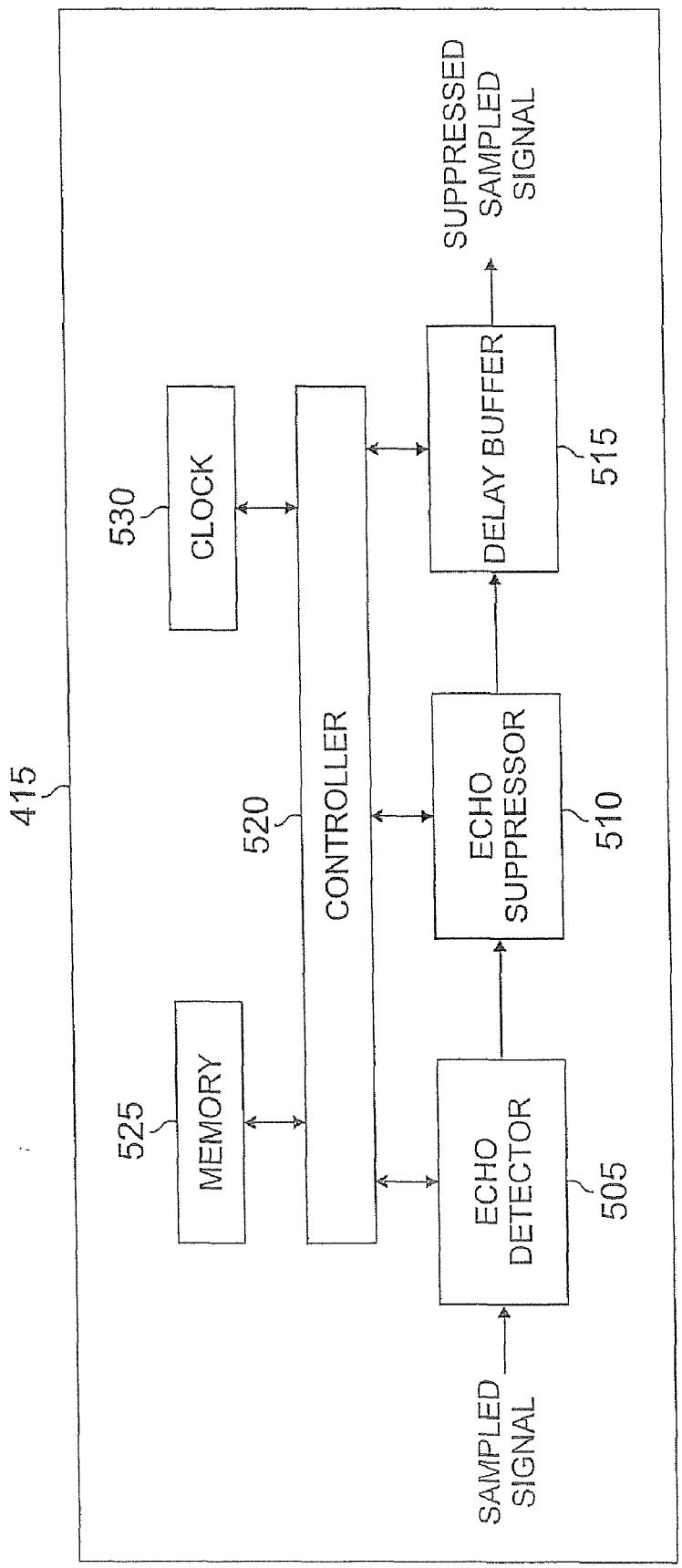
FIG. 5 illustrates an exemplary echo processor block according to one embodiment of the present invention.

FIG. 5 illustrates exemplary echo processor 415 according to one embodiment of the present invention. Echo processor 415 comprises echo detector 505, echo suppressor 510, delay buffer 515, controller 520, memory 525 and clock 530. Echo detector 505 searches for any time-delayed echoes in the sampled data. Echo suppressor 510 subtracts any detected echoes from the sampled data stream. In order to reduce the correlation between the original signal and echoed signals, the resulting signal samples are delayed in delay buffer 515 for a time specified by controller 520. Those familiar with the art will recognize that conventional auto-correlation methods may be used to determine the time delay of each echo. The echo detection and echo subtraction may occur serially or in multiple parallel branches, one for each expected echo.

Figure 6:
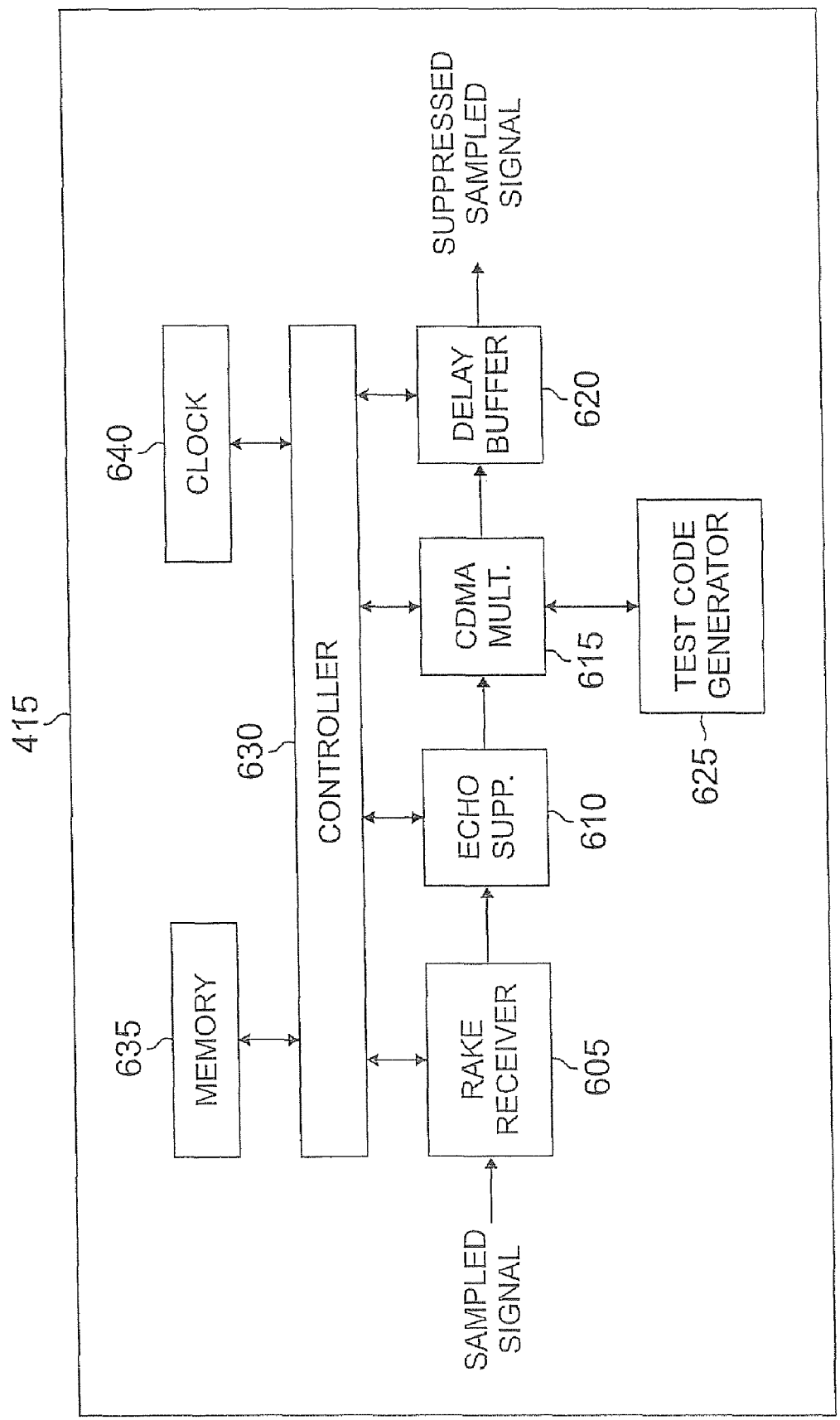
FIG. 6 illustrates an exemplary echo processor block according to another embodiment of the present invention.

FIG. 6 illustrates exemplary echo processor 415 according to another embodiment of the present invention. In the embodiment shown in FIG. 6, repeater 120 processes code division multiple access (CDMA) signals. Echo processor 415 comprises RAKE receiver 605, echo suppressor 610, CDMA multiplier 615, delay buffer 620, test code generator 625, controller 630, memory 635 and clock 640. RAKE receiver 605 detects multipath signals, including echo signals, in the incoming signal samples.

CDMA multiplier 615 receives a low-power test code generated by test code generator 625. CDMA multiplier 615 multiplies the test code by an unused Walsh code and combines the test code with the signal samples. The low-power test code signal is sufficiently strong so that its echo may be picked up by the receive antenna after transmission. However, the test code signal is too weak to cause interference to a distant mobile station. Since repeater 120 knows the exact value of the test code signal, it is relatively easy to detect the echo of the test code signal. RAKE receiver 605 uses correlation or matched filter techniques to detect any time-delayed, cross-polarized test code signals coupled into the sampled signal from the receiver input antenna. Echo suppressor 610 uses the time-delay information associated with the test code signal to determine the exact propagation delay through repeater 120. Echo suppressor 610 uses the propagation delay information to subtract each echo signal from the sampled data stored in memory 635.

In an alternate embodiment of the present invention, CDMA multiplier 615 and test code generator 625 may be replaced by a low-frequency (LF) reference modulation signal generator. Echo detector 505 (or RAKE receiver 605) uses a lock-in amplifier or phase-shift detection techniques to detect the modulated low-frequency signal coupled into the input. The relative phase shift between the modulation of the received signal and the reference modulation signal provides the echo time delay.

To prevent the onset of instabilities or oscillations upon power up of repeater 120, controller 630 ramps up the output power amplifier gain while echo processor 415 learns of the existence of echo terms. The amplifier gain is increased until either the maximum allowed value is reached or until echo processor 415 no longer provides sufficient suppression of echo signals.

Repeater 120 uses a novel combination of techniques to minimize echoes in the transmitted signals. These techniques include the use of orthogonally polarized antenna elements 301 and 302 in the donor and server sides of repeater 120, coupled with intervening signal processor 230 that removes or greatly attenuates echoes coupled into the opposite polarization. The antennas are oriented at 180-degrees with respect to their high-gain directions, respectively. Antenna arrays 122 and 124 also have high front-to-rear isolation. The echo detection and cancellation processes in signal processor 230 are greatly enhanced by the use of delay buffers 515 and 620 that follow suppression of detected echo components in the input signal.

Although the present invention has been described with an exemplary embodiment, various changes and modifications may be suggested to one skilled in the art. It is intended that the present invention encompass such changes and modifications as fall within the scope of the appended claims.

What is claimed is:

1. A repeater for re-transmitting signals between a first wireless device and a second wireless device comprising:
   a first antenna array for receiving a forward channel signal transmitted from said first wireless device;
   a second antenna array for receiving a reverse channel signal transmitted from said second wireless device;
   a first transceiver chain capable of down-converting said received forward channel signal, processing said down-converted forward channel signal, and up-converting said processed forward channel signal to thereby produce an outgoing forward channel signal suitable for transmission to said second wireless device; and
   a second transceiver chain capable of down-converting said received reverse channel signal, processing said down-converted reverse channel signal, and up-converting said processed reverse channel signal to thereby produce an outgoing reverse channel signal suitable for transmission to said first wireless device, wherein said first antenna array comprises a first antenna element and said second antenna array comprises a second antenna element that is cross-polarized with respect to said first antenna element,
   wherein each of said first and second transceiver chains further comprises an echo processor that delays transmission of said outgoing one of said forward and reverse channel signals in order to minimize an echo signal in a respective one of said down-converted forward and reverse channel signals, wherein said echo processor comprises a multiplier that multiplies a test code by an unused walsh code, combines the test code with at least one signal sample, and detects the echo from the signal sample.

2. The repeater as set forth in claim 1, wherein a ground plane associated with said repeater is disposed between said first antenna array and said second antenna array to thereby provide isolation between said first and second antenna arrays.

3. The repeater as set forth in claim 2, wherein each of said echo processors is capable of attenuating in said respective one of said down-converted forward and reverse channel signals said echo signal associated with a respective one of said outgoing forward and reverse channel signals.

4. The repeater as set forth in claim 1, wherein said each echo processor comprises an echo detector for detecting said echo signal in said respective one of said down-converted forward and reverse channel signals.

5. The repeater as set forth in claim 4, wherein said each echo processor further comprises an echo suppressor for suppressing at least a part of said echo signal in said respective one of said down-converted forward and reverse channel signals.

6. The repeater as set forth in claim 5, wherein said each echo processor comprises a delay buffer for delaying transmission of said respective one of said down-converted forward and reverse channel signals.

7. The repeater as set forth in claim 6, wherein said each echo processor further comprises a test signal generator capable of adding a known test signal to said respective one of said down-converted forward and reverse channel signals.

8. The repeater as set forth in claim 7, wherein said echo processor is capable of detecting an echo of said test signal in said respective one of said down-converted forward and reverse channel signals and using a delay associated with said test signal echo to determine a delay associated with said delay buffer.

9. The repeater as set forth in claim 8, further comprising:
a first duplexer capable of coupling said first antenna array to an input of said first transceiver chain and to an output of said second transceiver chain; and
a second duplexer capable of coupling said second antenna array to an output of said first transceiver chain and to an input of said second transceiver chain.

10. A wireless network comprising:
a plurality of base stations capable of communicating with a plurality of mobile stations in a coverage area of said wireless network; and
a repeater for re-transmitting signals between a first base station and a first mobile station, said repeater comprising:
a first antenna array for receiving a forward channel signal transmitted from said first base station;
a second antenna array for receiving a reverse channel signal transmitted from said first mobile station;
a first transceiver chain capable of down-converting said received forward channel signal, processing said down-converted forward channel signal, and up-converting said processed forward channel signal to thereby produce an outgoing forward channel signal suitable for transmission to said first mobile station; and
a second transceiver chain capable of down-converting said received reverse channel signal, processing said down-converted reverse channel signal, and up-converting said processed reverse channel signal to thereby produce an outgoing reverse channel signal suitable for transmission to said first base station, wherein said first antenna array comprises a first antenna element and said second antenna array comprises a second antenna element that is cross-polarized with respect to said first antenna element,
wherein each of said first and second transceiver chains further comprises an echo processor that delays transmission of said outgoing one of said forward and reverse channel signals in order to minimize an echo signal in a respective one of said down-converted forward and reverse channel signals, wherein said echo processor comprises a multiplier that multiplies a test code by an unused walsh code, combines the test code with at least one signal sample, and detects the echo from the signal sample.

11. The wireless network as set forth in claim 10, wherein a ground plane associated with said repeater is disposed between said first antenna array and said second antenna array to thereby provide isolation between said first and second antenna arrays.

12. The wireless network as set forth in claim 11, wherein each of said echo processors is capable of attenuating in said respective one of said down-converted forward and reverse channel signals said echo signal associated with a respective one of said outgoing forward and reverse channel signals.

13. The wireless network as set forth in claim 10, wherein said each echo processor comprises an echo detector for detecting said echo signal in said respective one of said down-converted forward and reverse channel signals.

14. The wireless network as set forth in claim 13, wherein said each echo processor further comprises an echo suppressor for suppressing at least a part of said echo signal in said respective one of said down-converted forward and reverse channel signals.

15. The wireless network as set forth in claim 14, wherein said each echo processor comprises a delay buffer for delaying transmission of said respective one of said down-converted forward and reverse channel signals.

16. The wireless network as set forth in claim 15, wherein said each echo processor further comprises a test signal generator capable of adding a known test signal to said respective one of said down-converted forward and reverse channel signals.

17. The wireless network as set forth in claim 16, wherein said echo processor is capable of detecting an echo of said test signal in said respective one of said down-converted forward and reverse channel signals and using a delay associated with said test signal echo to determine a delay associated with said delay buffer.

18. The wireless network as set forth in claim 17, further comprising:
a first duplexer capable of coupling said first antenna array to an input of said first transceiver chain and to an output of said second transceiver chain; and
a second duplexer capable of coupling said second antenna array to an output of said first transceiver chain and to an input of said second transceiver chain.

19. The wireless network as set forth in claim 12, wherein said each echo processor comprises an echo detector for detecting said echo signal in said respective one of said down-converted forward and reverse channel signals.

20. A wireless network comprising:
a plurality of base stations capable of communicating with a plurality of mobile stations in a coverage area of said wireless network; and
a repeater comprising a first antenna array, a second antenna array, a first transceiver chain, and a second transceiver chain, wherein each of said first and second transceiver chains further comprises an echo processor that delays transmission of a signal, wherein said echo processor comprises a multiplier that multiplies a test code by an unused Walsh code, combines the test code with at least one signal sample, and detects the echo from the signal sample, and wherein at least one element in the first antenna array is cross polarized relative to the second antenna array.

* * * * *